United States Patent
Lupien, Jr. et al.

(10) Patent No.: US 6,996,659 B2
(45) Date of Patent: Feb. 7, 2006

(54) GENERIC BRIDGE CORE

(75) Inventors: Gordon F. Lupien, Jr., Ontario, NY (US); Dimitry Paylovsky, Rochester, NY (US); David C. Maslyn, Jr., Kendall, NY (US)

(73) Assignee: LSI Logic Corporation, Milpitas, CA (US)

( * ) Notice: Subject to any disclaimer, the term of this patent is extended or adjusted under 35 U.S.C. 154(b) by 340 days.

(21) Appl. No.: 10/209,467

(22) Filed: Jul. 30, 2002

(65) Prior Publication Data

US 2004/0024943 A1 Feb. 5, 2004

(51) Int. Cl.
*G06F 13/36* (2006.01)
*H04L 12/28* (2006.01)

(52) U.S. Cl. ............... 710/315; 710/306; 710/310; 370/402

(58) Field of Classification Search ........ 710/305–315; 370/402

See application file for complete search history.

(56) References Cited

U.S. PATENT DOCUMENTS

| | | | | |
|---|---|---|---|---|
| 5,490,252 A | * | 2/1996 | Macera et al. | 709/249 |
| 5,522,050 A | * | 5/1996 | Amini et al. | 710/315 |
| 5,664,122 A | * | 9/1997 | Rabe et al. | 710/307 |
| 6,058,263 A | * | 5/2000 | Voth | 703/25 |
| 6,101,566 A | * | 8/2000 | Woods et al. | 710/315 |
| 6,226,700 B1 | * | 5/2001 | Wandler et al. | 710/312 |
| 6,301,632 B1 | * | 10/2001 | Jaramillo | 710/105 |
| 6,412,033 B1 | * | 6/2002 | Gray et al. | 710/315 |
| 6,480,923 B1 | * | 11/2002 | Moertl et al. | 710/305 |
| 6,715,022 B1 | * | 3/2004 | Ahern | 710/314 |
| 2002/0138682 A1 | * | 9/2002 | Shatas et al. | 710/306 |
| 2004/0024946 A1 | * | 2/2004 | Naumann et al. | 710/309 |

* cited by examiner

*Primary Examiner*—Thomas Lee
*Assistant Examiner*—Nimesh G. Patel
(74) *Attorney, Agent, or Firm*—Christopher P. Maiorana, P.C.

(57) ABSTRACT

An apparatus comprising a plurality of first circuits and a second circuit. Each of the first circuits may be configured to translate attributes and data between one of a plurality of first predetermined formats and a second predetermined format. The second circuit may be configured to route the attributes and data in the second predetermined format from one of the first circuits to another of the first circuits.

20 Claims, 11 Drawing Sheets

GENERIC BRIDGE CORE

FIELD OF THE INVENTION

The present invention relates to a method and/or architecture for coupling busses generally and, more particularly, to a method and/or architecture for a core of a bridge device that provides a data interconnect between two or more busses.

BACKGROUND OF THE INVENTION

Bus bridging is a common problem as more and more embedded processors (EP) are integrated onto a device. Bus bridging allows the integration of embedded processors without redesigning the interfaces on the embedded processors or modifying the specification of a given bus for a specific design or application.

Conventional bridge core devices are designed to interface between a specific set of bus types. Once the design is completed for one set of bus types, the resulting architecture cannot easily be re-targeted for another application involving a different set of bus types. Additionally, the connection to a specific bus interface is very design or application specific and the logic of the bridge becomes intertwined with the logic of the device. Another reason the bridges are not easily separated or re-used is that one of the bus interfaces (usually an internal one) can become limited or configured to operate under a very specific set of circumstances.

SUMMARY OF THE INVENTION

The present invention concerns an apparatus comprising a plurality of first circuits and a second circuit. Each of the first circuits may be configured to translate attributes and data between one of a plurality of first predetermined formats and a second predetermined format. The second circuit may be configured to route the attributes and data in the second predetermined format from one of the first circuits to another of the first circuits.

The objects, features and advantages of the present invention include providing a method and/or architecture for a core of a bridge device that may (i) provide a data interconnect between two or more busses, (ii) allow bridges between a wide variety of bus interfaces to be developed quickly, (iii) allow data ordering, buffering, address translation and translation routing rules to be changed with minimal effort, and/or (v) provide a core that can be refused to bridge a wide variety of bus types with minimal changes.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
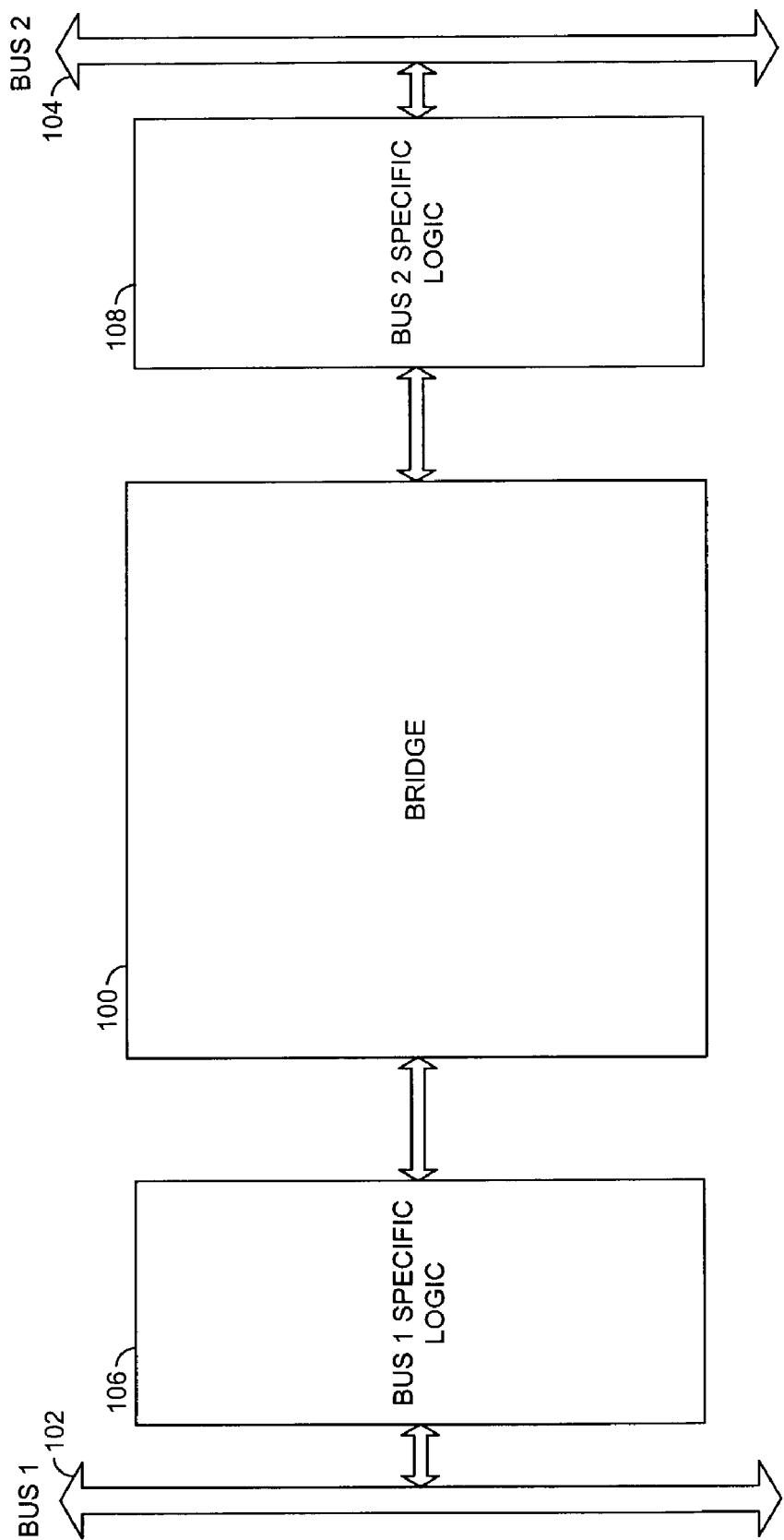
FIG. 1 is a block diagram of a preferred embodiment of the present invention.

Referring to FIG. 1, a block diagram of a circuit (architecture) 100 is shown in accordance with a preferred embodiment of the present invention. The circuit 100 may be implemented as a generic bridge core for coupling two or more busses. In one example, the busses may be implemented passively inside of a design. The circuit 100 may be configured as a master device and all other devices on the busses configured as targets. In one example, the busses may comprise embedded processor busses. However, the circuit 100 may also be implemented in systems with no processors. For example, a system may be as simple as a number of devices communicating with one another across the circuit 100. In one example, simple sequential logic may be implemented to configure the busses from data contained in a non-volatile memory. When the system is implemented in deterministic logic, the system may start up in the same state and be configured similarly.

In one example, the circuit 100 may be implemented as a bridge between a bus 102 (e.g., BUS1) and a bus 104 (e.g., BUS2). The busses 102 and 104 may be, in one example, dissimilar busses. The circuit 100 may be coupled (i) to the bus 102 via a circuit 106 and (ii) to the bus 104 via a circuit 108. The circuits 106 and 108 may be implemented as bus specific logic circuits. In one example, the circuits 106 and 108 may include conventional bus interface cores (e.g., from InSilicon, DCM, Synopsys, etc.). The circuits 106 and 108 generally communicate attributes and data between the circuit 100 and the busses 102 and 104, respectively. The circuits 106 and 108 generally translate the attributes and data between a format compatible to the bus specifications of the respective busses 102 and 104 and a format of the circuit 100.

The circuit 100 may be implemented as a re-targetable central logic that may be configured to provide an efficient bus bridge implementation between two or more busses of similar or different types. The circuit 100 generally comprises rule-based routing logic that may be configured to translate and route transaction information between the two or more bus interfaces.

Figure 2:
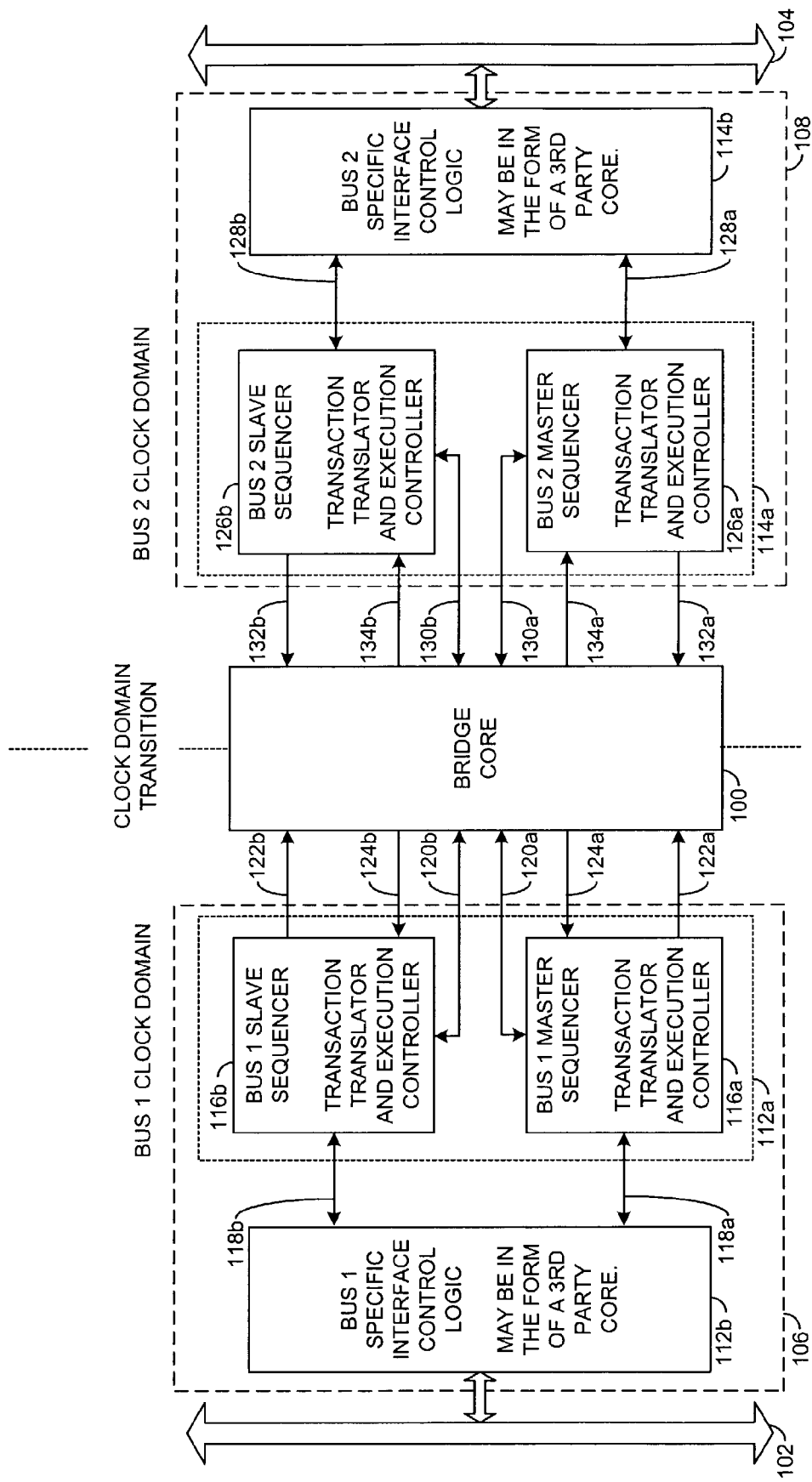
FIG. 2 is a more detailed block diagram of a bridge implemented in accordance with a preferred embodiment of the present invention.

Referring to FIG. 2, a more detailed block diagram of the circuit 100 is shown. In one example, the circuit 106 may comprise a circuit 112a and a circuit 112b. The circuit 108 may comprise a circuit 114a and a circuit 114b. The circuits 112a and 114a may be implemented as sequencer circuits. The circuits 112a and 114a may be configured to translate transaction information between a first format acceptable to the associated bus (e.g., the busses 102 and 104 respectively) and a second format acceptable to the circuit 100. The circuits 112b and 114b may be implemented as conventional bus interface cores.

The circuit 112a may comprise, in one example, a sequencer 116a (e.g., a master sequencer) and a sequencer 116b (e.g., a slave sequencer). The circuit 114a may comprise, in one example, a sequencer 126a (e.g., a master sequencer) and a sequencer 126b (e.g., a slave sequencer). The circuit 100 may also comprise one or more configurable first-in-first-out (FIFO) attribute memories and one or more data buffers (described in more detail in connection with FIG. 3) that may be configured to steer the bridge transactions.

The sequencers 116a and 116b may be configured to communicate attributes and data to and from the interface 112a via bidirectional busses 118a and 118b, respectively. The sequencers 116a and 116b may communicate data to the circuit 100 via bidirectional pathways 120a and 120b, respectively. The circuits 116a and 116b may (i) present attributes to the circuit 100 via a pathway 122a and 122b, respectively, and (ii) receive attributes from the circuit 100 via pathways 124a and 124b, respectively. The circuit 114a may be implemented similarly to the circuit 112a. Sequencers 126a and 126b may communicate attributes and data with the interface 114b via bidirectional busses 128a and 128b, respectively. The sequencers 126a and 126b may communicate data with the circuit 100 via bidirectional busses 130a and 130b, respectively. The circuits 126a and 126b may (i) present attributes to the circuit 100 via pathways 132a and 132b, respectively, and (ii) receive attributes from the circuit 100 via pathways 134a and 134b, respectively.

The circuit 112a may be configured to translate attributes and data from the bus interface 112b into a predetermined (or generic) attribute entry and data buffer entry. The circuit 114a may be configured similarly to translate attributes and data from the bus interface 114b. Once the transaction information is in a generic form that can be utilized by each of the sequencers attached to the circuit 100, the transaction information may be submitted to the circuit 100 by an initiating sequencer. The transaction information is generally routed from the initiating sequencer to a target sequencer or sequencers for execution. The routing of the transaction information is generally determined by a set of rules. The set of rules may be programmed into the circuit 100. The rule set generally applies the attributes stored in the transaction attribute entry to determine the target sequencer or sequencers.

The specific bus interface 112b or 114b receiving a transaction generally maps the addresses to which the interface may respond. The interfaces are not generally aware of the logic in the circuit 100. The address translation of attributes received from transactions accepted by the bus interfaces 114a and 114b are generally converted in the circuit 100. Software is generally implemented to configure the bus interface address range and address translation tables within the circuit 100 with the same addresses for remapping.

The configuration may be performed in a variety of ways. For example, in one mode of operation, the host system may execute a PCI-X configuration of the circuit 100 as a device. The software driver may be configured to read the configuration space to see what address range has been set for the circuit 100 and program the address translation tables accordingly. Again, the address translation tables have nothing to do with what transactions are accepted by the circuit 100. When the programming is done incorrectly, the bus interface will receive transactions that may not be mapped properly by the address translation tables. Such a condition may or may not result in errors, depending on the amount of error checking implemented in the circuit 100.

In general, the sequencers 116a, 116b, 126a and 126b may operate in a number of different modes (e.g., initiator, master, requester, target, slave, completer, etc.). A transaction initiated from a device on a bus connected to the circuit 100 (e.g., the bus 102 or the bus 104) is generally handled by the target sequencer (e.g., the sequencer 116a, 116b, 126a or 126b) connected to the bus interface (e.g., 112b or 114b) for that bus. The target or slave sequencer (e.g., the sequencer 116b or 126b) generally handles target transactions (e.g., where the circuit 100 is the receiving end of the transaction and the bus device the initiator). The Master Sequencer (e.g., 126a or 116a) generally handles the execution of a transaction on the bus that is initiated by the circuit 100, rather than an external device. The sequencers 116a, 116b, 126a, and 126b are generally not implemented as common blocks (e.g., differentiated) in the architecture of the circuit 100. The sequencers are the bus specific translation designs that are completed once for any bus type that is to be connected to the circuit 100.

When operating as a target sequencer, the sequencers may accept a simple transaction. For example, the sequencer 116b may receive a transaction from the bus interface 112b (e.g., in whatever format the interface accepts) and convert the transaction to the predetermined generic format of the attribute and data format of the circuit 100. The attributes converted generally include the attributes of a transaction that are needed for each or every one of the busses coupled to the circuit 100. When one of the busses employs an attribute, the attribute is generally included in all transactions. A target sequencer responding to a simple bus request is generally a re-packager of attributes.

When a sequencer is operating as a master sequencer (e.g., the sequencer 116a), the attributes received by the sequencer from the circuit 100 (e.g., from a routing manager of the circuit 100) are unpackaged into the format of the bus interface connected to the sequencer (e.g., the bus 102 format). The sequencer may comprise some "intelligence" to handle the interface provided by the bus interface. However, the tasks performed by the sequencer may be minimized to allow the design of the sequencer to be as simple as possible.

When the attributes have been formatted for the bus interface (e.g., the bus interface 102) by the sequencer (e.g., the sequencer 116a), the attributes are generally submitted as a transaction request to the bus interface (e.g., a PCI-X InSilicon core, an AHB bus core, etc.). The bus interface executes the transaction (e.g., the bus interface may comprise an application logic interface that generally follows a set of rules for executing bus transactions). The bus interface 102 generally notifies the sequencer 116a (e.g., via the application logic interface 112b) either that the transaction completed successfully or that something happened to cause the transaction to become a pending transaction again. When the transaction becomes a pending transaction again, the transaction attributes are generally re-packaged back into the format of the circuit 100 (or a copy of the existing format may be saved and/or modified to reflect the response of the bus interface) and then placed in a done FIFO for that sequencer. The transaction is generally routed again by the circuit 100. In one example, such a transaction may occur when a transaction receives a split response.

The sequencers 116a and 116b or 126a and 126b may also operate as a split transaction completer. When a split transaction occurs, the split transaction is generally routed by the circuit 100 to a target sequencer (e.g., the sequencer 116b or 126b). The target sequencer may be configured to handle split completions. In one example, a split transaction may need to be handled immediately (e.g., due to specific conditions on, for example, the PCI-X bus). A split transaction as used herein refers to a transaction that is generally put on hold for a time while the resource accessed initially completes the access. The transaction that is on hold can then be revived and completed with the retrieved data. Hence the transaction is split into two parts. However, both parts are generally specific to the bus that the transaction occurred on.

When split transactions are to be handled immediately, the sequencer (e.g., the sequencer 116a) may be configured to read all split transaction attributes from the pending FIFO immediately and place the attributes in a table. The sequencer 116a may be further configured to search the table whenever a split transaction completion is received from the bus interface (e.g., the bus interface 112b). The bus interface 112b may be configured to provide a pointer into the table in the form of a tag or one or more of the transaction attributes. When the transaction is found in the table, the data for the transaction is generally requested from the circuit 100 (e.g., from a data buffer) and the transaction is generally completed by the target sequencer 116a.

In most cases, the bus specifications do not generally include the targets requesting the completion of a transaction received by the target. Such a configuration generally necessitates the inclusion of a master and target (or slave) in every device. When a bus specification includes such a configuration (e.g., the PCI-X bus), the sequencers for the bus are generally more complex. A bus that allows target sequencers to refuse transactions also employs more complex sequencers and may add additional routing rules to the circuit 100 (e.g., in a routing manager).

In general, a target sequencer (e.g., the sequencer 116b) may be configured to perform the following: receive a bus transaction from the bus interface (e.g., the bus interface 112b) that was initiated by a master on the same bus (e.g., the sequencer 116a); extract and package the attributes of the transaction into a format accepted by the circuit 100; store the data of the transaction into the buffer pointed to by the next free buffer pointer received from the circuit 100 (e.g., a new one may be generated and provided during the execution of the transaction); place the attribute package into the done FIFO; and/or wait for a next transaction.

In general, a master sequencer (e.g., the sequencer 116a) may be configured to perform the following: receive a package of attributes by reading an associated pending FIFO; unpackage the attributes and convert the attributes into the format of the target bus (e.g., the bus 102) (e.g., simply expanding the address and data, etc.); point to the data buffer for the transaction; notify the bus interface (e.g., the bus interface 112b) of the transaction to be executed; handle the bus interface 112b responses, including sending data from the data buffer as necessary and handling any error or split conditions; prepare a "status" package for the circuit 100 containing the attributes of the submitted transaction and the completion results; and/or write the status package to the done FIFO associated with the sequencer.

When a target sequencer (e.g., the target sequencer 116b) is configured to double as a completer, the sequencer 116b may be configured to perform the following: complete split or pending transactions in response to predetermined conditions; receive the attribute package for the transactions via the pending FIFO; unpackage the attributes and either execute the attributes immediately (e.g., in the case of the AHB bus) or enter the attributes into a local table of attributes for execution as the completion requests are received from masters (e.g., sequencer 116a) on the bus (e.g., in the case of a PCI-X bus); search the local table for the given attributes of the transaction, when a master on the bus (e.g., the sequencer 116a) requests a completion via the bus interface (e.g., interface 112b) to the sequencer; read the data for the transaction from the data buffer and write to the bus interface (e.g., the interface 112b) to complete the transaction (and vice versa on a split read transaction, where the data is written into the data buffer from the bus interface); work through the bus interface (e.g., the interface 112b) to re-establish a connection with the target (e.g., sequencer 116b) the original master (e.g., sequencer 116a) was trying to reach and send the data when the sequencer is configured to immediately complete the transaction; and/or generate a status attribute package and place the package in the respective done FIFO. The status package is generally used by the circuit 100 to clear data buffers and return resources to the global resource pool (e.g., used by a free pointer manager).

In general, the bridge transaction flow rules may be managed by a portion of the circuit 100 (e.g., a routing manager). The circuit 100 may be re-targeted (e.g., reconfigured for a different set of bus types) by re-configuring the rule set. Reconfiguring the rule set may involve, in one example, modifying the widths of buffers for the new target bus types and modifying the actual conditional statements that determine to where a specific transaction flows during bridge operation. In general, the circuit 100 may be re-targeted without modifying FIFO or buffer operation, flow control logic, or other core attributes. However, the width of attribute busses (and the width of any associated FIFOs) and a rules engine that interprets the attributes may change as part of re-targeting the circuit 100.

The transfer of transactions through the circuit 100 is generally clock independent. In general, the circuit 100 may operate independently of the clocks of the various bus interfaces connected to the circuit 100. Depending on the type of transaction and the reaction on the target bus, several different data flow scenarios may take place (described in more detail in connection with FIGS. 5–8).

Figure 3:
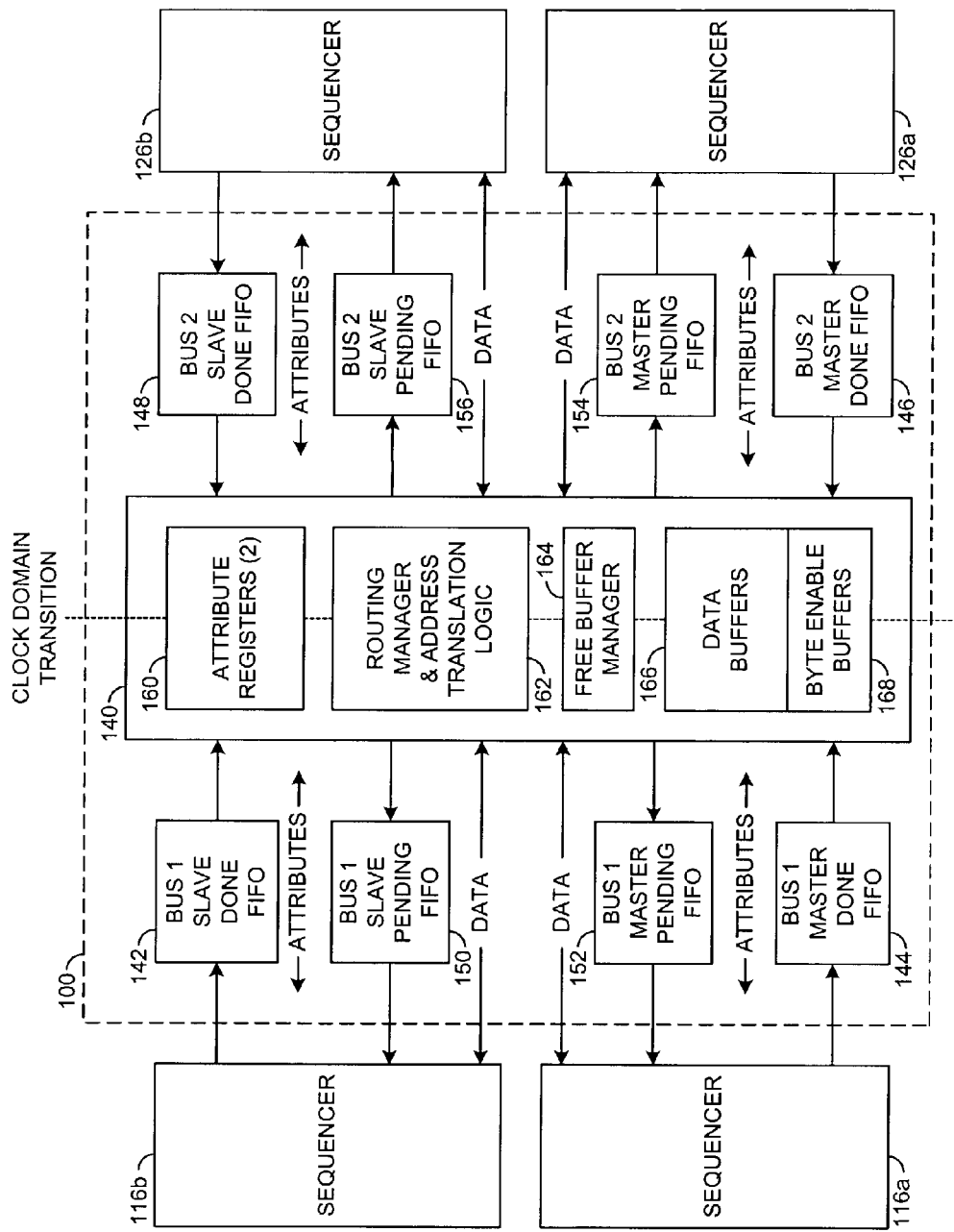
FIG. 3 is a block diagram of a bridge core in accordance with a preferred embodiment of the present invention.

Referring to FIG. 3, a more detailed block diagram of a bridge core of FIG. 2 is shown. The circuit 100 may comprise a circuit 140 and a number of first-in-first-out (FIFO) memories 142–156. The circuit 140 may be implemented as a central routing logic for the circuit 100. The circuit 140 may comprise clock domain transition registers (e.g., attribute registers) 160, a routing manager and address translation logic 162, a free buffer manager 164 and a common data buffer 166 that may contain byte enables 168 for each data byte in a transaction. The FIFO memories 142–156 are generally configured to buffer attribute entries (e.g., "Done" and "Pending" attributes).

The difference between done and pending attributes is generally minimal and the data widths and handling within the FIFOs 142–156 may be substantially the same. The done and pending attributes generally comprise similar entries. However, the attributes are generally differentiated by one or more data bits that indicate that the transactions are either still pending (e.g., the transaction is still active for the current targeted sequencer and to be acted upon) or done (e.g., the sequencer has submitted the transaction to the bus logic and a response has been received). Done attributes, however, do not always mean that the transaction associated with the attributes is complete. The term done as used herein generally refers to a transaction that has completed a "stay" with the specific sequencer and is generally re-processed by the circuit 100 (or a routing manager within the circuit 100).

The FIFOs 142–148 may be implemented similarly in design and functionality. The FIFOs 142–148 may be configured to store the attributes of completed transactions of the corresponding sequencers 116a, 116b, 126a and 126b. The FIFOs 142–148 are generally referred to herein as "done" FIFOs for clarity. The sequencers 116a, 116b, 126a and 126b may have either (i) created the transaction entries as targets of a bus transaction, or (ii) received the transaction from another sequencer in the bridge architecture. The routing manager 162 generally forwards the transaction to another sequencer via the associated "Pending" FIFOs 150–156 based on the attribute entry information.

The FIFOs 150–156 may be implemented similarly in design and functionality. The FIFOs 150–156 generally store the attribute entries of transactions pending execution by the corresponding sequencers 116a, 116b, 126a, 126b. The FIFOs 150–156 are generally referred to herein as "pending" FIFOs for clarity. The FIFOs 150–156 are generally implemented in compliance with transaction ordering rules for bridges. Transaction attribute entries are generally written into the FIFOs 150–156 by the routing manager 162. The routing manager 162 is generally configured to route transaction attribute entries to an appropriate target sequencer based on information contained within the attribute entry.

In general, a read transaction may occur as follows. A device (e.g., a master device) on one of the busses bridged by the circuit 100 may initiate a read transaction that maps into the address space allocated to the circuit 100 for the respective bus interface. The circuit 100 may be configured to respond to the transaction via the respective interface. For example, where the circuit 100 is configured to bridge a PCI-X bus and an AHB bus, the circuit 100 may respond with either a PCI-X Core slave logic or a AHB slave interface. In one example, the bus interface may be configured to automatically generate a split transaction in order to release the initiating bus during processing of the read transaction.

The sequencer associated with the initiating interface may be configured to gather, format and store the attributes of the transaction (e.g., address, transaction type, common data buffer pointer, etc.) in a temporary internal buffer. At this point, the data buffer within the common data buffer block 166 that is pointed to by the common data buffer pointer is generally empty. The sequencer may be configured to retrieve another common buffer pointer from the free buffer manager 164 for the next transaction in parallel (or simultaneously) with the completion of the current transaction.

When the read transaction is completed as a split transaction on the initiating bus, the attributes entry generated by the sequencer in response to the read transaction is generally placed into a respective one of the done FIFOs 142–148 for the sequencer in preparation for routing. In response to the placement of the attributes entry in the done FIFO 142–148, the routing manager 162 is generally notified of the transaction by the respective done FIFO 142–148 and reads the attribute entry for the transaction out of the done FIFO 142–148. The routing manager 162 is generally configured (i) to operate on the attributes according to a predefined (or programmed) set of routing rules and (ii) to determine the sequencer to which the transaction is to be transferred. In parallel, the transaction attributes may be modified and the address may be translated for the target bus.

The transaction attributes are generally placed into the respective pending FIFO 150–156 of the target sequencer. The target sequencer generally reads the attributes from the respective pending FIFO 150–156 and configures the data for the target bus interface (e.g., translates the data from a format acceptable to the circuit 100 to a format accepted by the target bus interface). The read transaction is generally executed on the target bus interface and the data of the read transaction is generally written into the common data buffer via the data buffer pointer transferred by the attributes. When the read transaction is completed on the target bus, the attribute entry is generally stored in the respective done FIFO 142–148 for the target sequencer.

The routing manager 162 generally reads the attributes from the respective done FIFO 142–148 of the target sequencer and transfers the attribute entry to the respective pending FIFO 150–156 of the appropriate sequencer for the initiating interface (e.g., where the split transaction is currently pending completion). The initiating sequencer generally reads the attribute entry from the respective pending FIFO 150–156 and contacts the initiating device to complete the transaction. The read data for the transaction is generally read from the common data buffer, formatted for the initiating bus, and transferred to the initiating device. Upon completion of the split transaction, the sequencer associated with the initiating device sets the transaction complete bit in the attribute entry and stores the attribute entry into the respective done FIFO 142–148.

Upon reading the attribute entry with the transaction complete bit set from the respective done FIFO 142–148, the routing manager 162 may be configured to de-allocate the resources associated with the transaction. For example, the common data buffer pointer is generally returned to the lists managed by the free buffer manager 164.

In general, a write transaction may occur according to the following process. A device (e.g., a master device) on one of the busses coupled to the circuit 100 may initiate a write transaction that maps into the address space allocated to the circuit 100 for the respective interface. The circuit 100 may be configured to respond to the write transaction via the respective interface. For example, when the circuit 100 bridges a PCI-X bus and an AHB bus, the circuit 100 may respond with either the PCI-X core slave logic or AHB slave interface depending on which bus is connected to the initiating device. A transaction initiated on one of the busses (e.g., from a PCI-X interface) may be remapped and routed back to the same interface. In one example, routing a transaction back to the initiating interface may be useful for testing whether the circuit 100 in the system to make sure the circuit 100 is properly programmed.

The sequencer associated with the initiating interface generally gathers, formats and stores the attributes of the transaction (e.g., address, transaction type, common data buffer pointer, etc.) in a temporary internal buffer. In one example, the endian and width of the transaction data may be converted and the converted transaction data stored in the common buffer accessible by all of the sequencers in the bridge. However, other conversions may be implemented to meet the design criteria of a particular application. The sequencer associated with the initiating interface may be configured to retrieve another common buffer pointer from the free buffer manager 164 for the next transaction in parallel with the completion of the current transaction.

When the write transaction is completed on the initiating bus, the attributes entry generated by the sequencer associated with the initiating interface is generally placed into the respective one of the done FIFOs 142–148 associated with the initiating sequencer in preparation for routing. The data of the transaction generally remains stored in the common data buffer. The routing manager 162 is generally notified of the transaction by the respective done FIFO 142–148 and reads the attribute entry for that transaction out of the respective done FIFO 142–148. The routing manager 162 may be configured (i) to operate on the attributes according to a set of predefined routing rules and (ii) to determine the target sequencer to which the transaction is to be transferred. In parallel, the transaction attributes are generally modified and the address is translated for the target bus.

The transaction attributes are generally placed into the respective pending FIFO 150–156 of the target sequencer. The target sequencer generally reads the attributes from the respective pending FIFO 150–156 and configures the data for the target bus interface (e.g., translates between the format of the circuit 100 and the format of the target bus). The transaction is generally executed on the target interface and the data is read from the common data buffer via the common data buffer pointer transferred by the attributes entry. When the transaction is completed on the target bus, the transaction complete status bit is generally set in the attributes field and the attributes are stored in the respective done FIFO 142–148 for the target sequencer.

Upon reading the attribute entry with the transaction complete status bit set from the respective done FIFO 142–148, the routing manager 162 may be configured to de-allocate the resources associated with the write transaction. In one example, the common data buffer pointer is generally returned to the lists managed by the free buffer manager 164.

Figure 4:
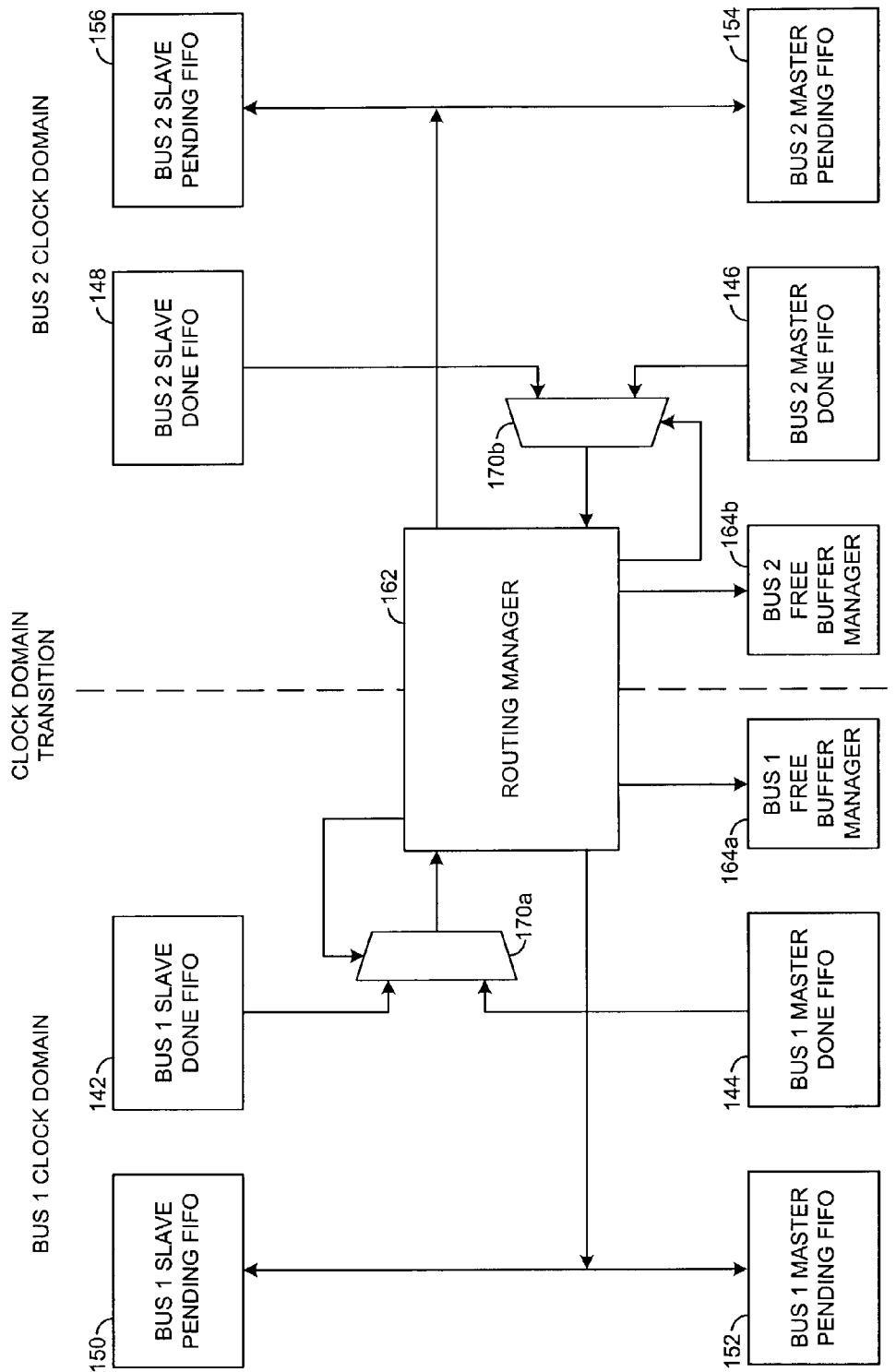
FIG. 4 is a block diagram of routing pathways in accordance with a preferred embodiment of the present invention.

Referring to FIG. 4, a block diagram illustrating pathways between the routing manager 162 and the FIFO memories of FIG. 3 is shown. The routing manager 162 is generally configured to (i) obtain a transaction attribute entry from one of the done FIFOs 142–148, (ii) make a forwarding decision based on the information embedded in the entry and the predetermined bridge routing rules, and (iii) forward the transaction to an appropriate one of the pending FIFOs 150–156. In addition, the routing manager 162 may be configured to monitor entries for a status bit that generally indicates that a transaction is completed. Upon receiving an entry with the transaction completed status bit asserted (e.g., set), the routing manager 162 may be configured to send control data to the free buffer manager 164 requesting release of the data buffer allocated for the just-completed transaction.

The routing manager 162 may be further configured to provide clock domain transition control and address/command remapping. The routing manager 162 is generally divided into a number of sections. In one example, the number of sections may be determined by the number of different clock domains (or bus interfaces). Each section generally operates in a respective clock domain. When a particular entry is destined for another side of the bridge, the entry generally crosses the clock domain transition and undergoes an address/command remapping (discussed in more detail in connection with FIG. 9).

In one example, the routing manager 162 may be configured to generate one or more control signals that may be used to multiplex inputs and outputs of the FIFOs 142–156. For example, a multiplexer 170a may be configured to select between an output of the FIFO 142 and an output of the FIFO 144 in response to a control signal from the routing manager 162. Similarly, a multiplexer 170b may be configured to present either an output of the FIFO 148 or an output of the FIFO 146 to an input of the routing manager 162 in response to a control signal generated by the circuit 162. Additional multiplexers may be implemented accordingly to route output of the circuit 162 to the inputs of the FIFOs 150–156. In general, the circuit 162 may be configured to select any of the pending 150–156 depending on the routing rules.

Figure 5:
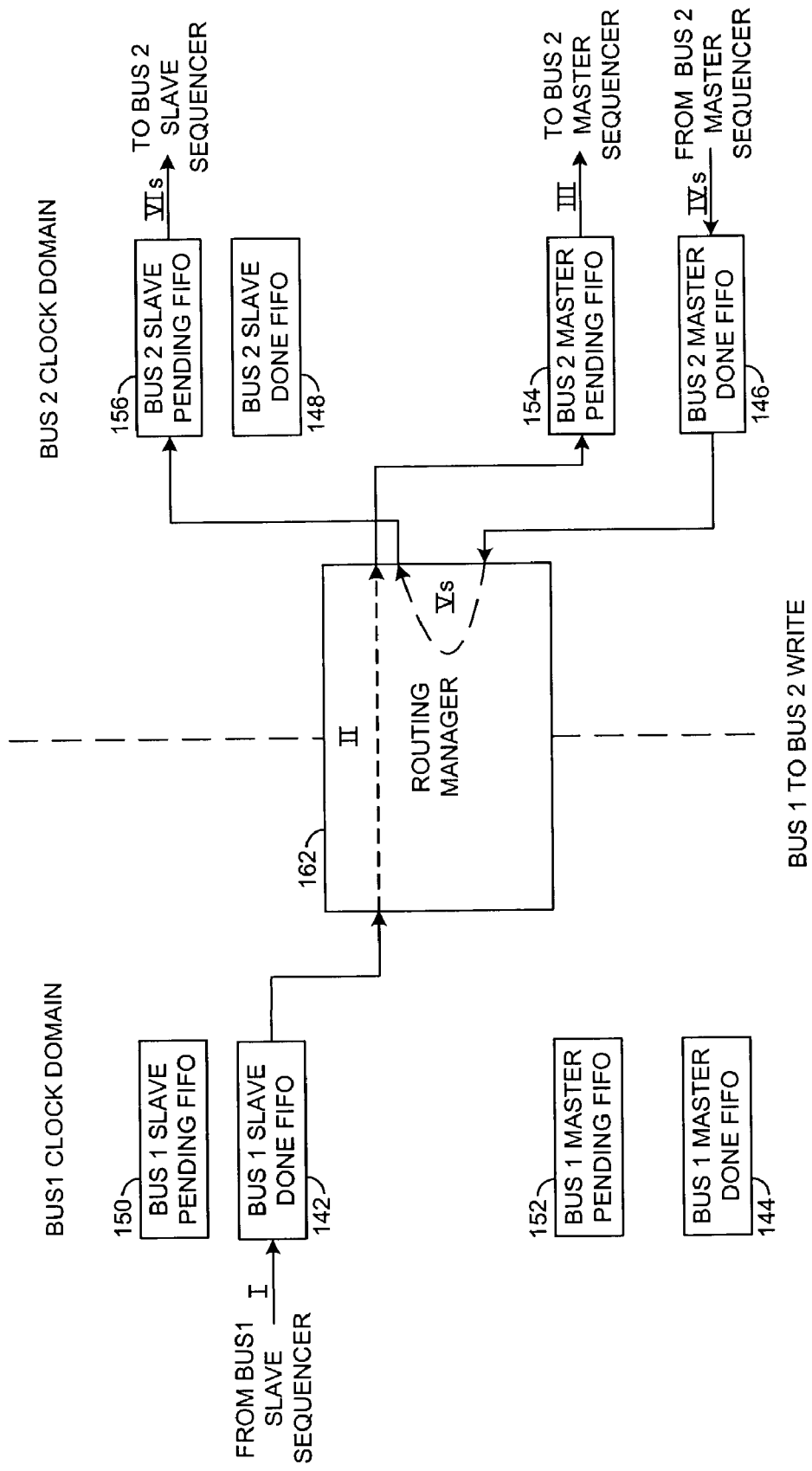
FIG. 5 is a block diagram illustrating an example operation of a routing manager in accordance with a preferred embodiment of the present invention.

Referring to FIG. 5 a block diagram of the circuit 110 illustrating an example write transaction is shown. Roman numerals in the diagram generally indicate the sequence of operations for the example transaction. Numbers with an "s" suffix denote split transaction operations. Depending on the respective bus types, the routing manager 162 may be configured to transfer an entry from the done FIFO 142 (e.g., received during a step I) to the pending FIFO 154 during a bus 1 to bus 2 write transaction (e.g., a step II). A split transaction on a write may occur, depending on the bus type and rule set encoded within the respective sequencers for the specific busses, because the target bus (e.g., the bus with respect to which the circuit 100 is a master) device is unable to accept the transaction data immediately. The device may respond with a split request. The bus interface generally notifies the sequencer that the split transaction has occurred. The sequencer may update the attributes and place the transaction attributes into the respective done FIFO 142–148. The circuit 100 generally handles the split transaction read from the respective done FIFO 142–148 and routes the transaction accordingly.

For example, the bus 2 master device upon receiving an entry from the pending FIFO 154 (e.g., a step III) may send an entry to the done FIFO 146 (e.g., a step IV). The routing manager 162 may read the entry through the done FIFO 146 and route the entry to the pending FIFO 156 (e.g., a step V). A bus 2 slave device may receive the entry from the pending FIFO 156 to complete the transaction (e.g., a step VI).

Figure 6:
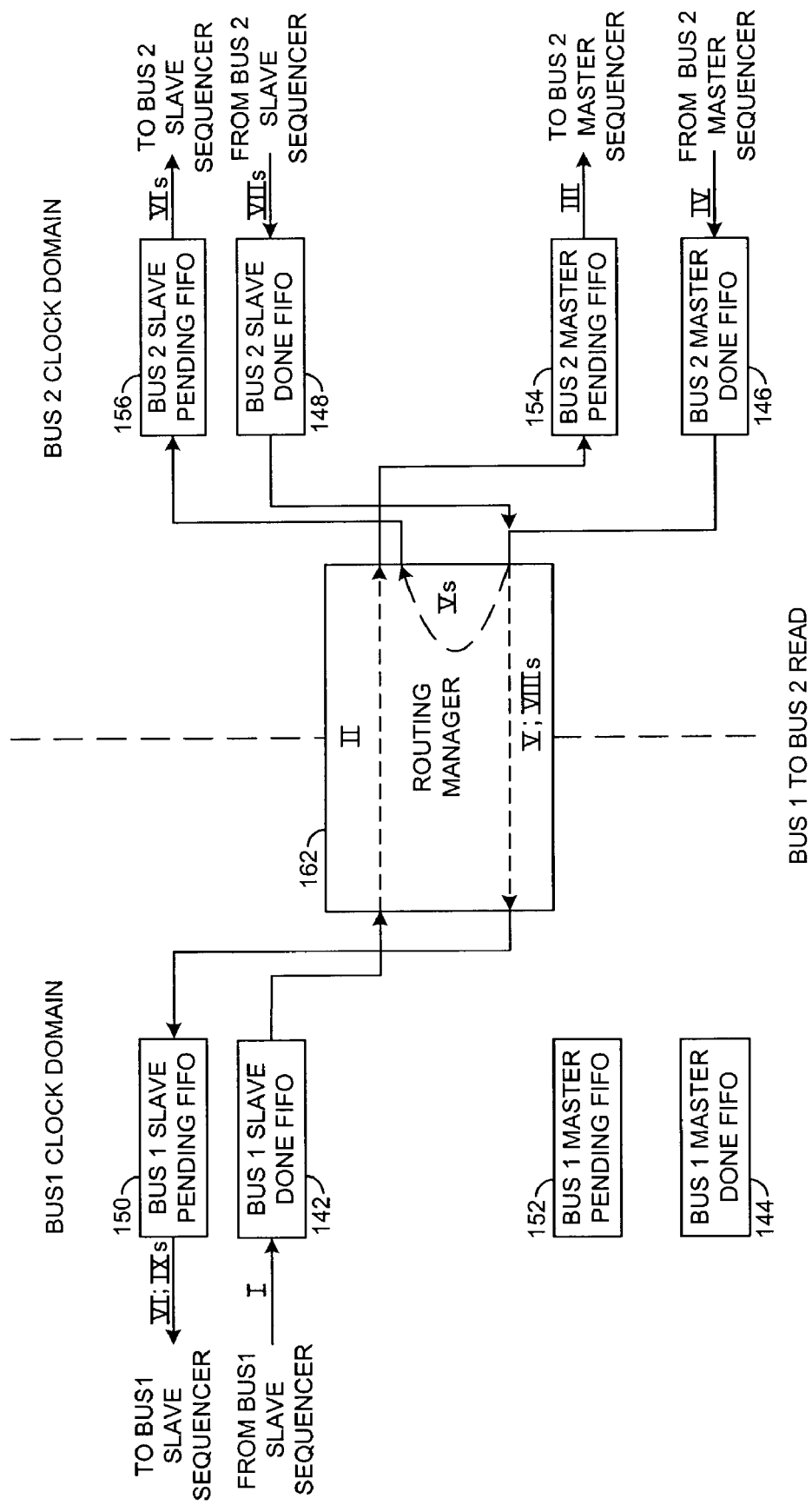
FIG. 6 is a block diagram illustrating another example operation of a routing manager in accordance with a preferred embodiment of the present invention.

Referring to FIG. 6, a block diagram of an example read operation is shown. Roman numerals in the diagram generally indicate the sequence of operation for the example transaction. Numbers with an "s" suffix generally denote a split transaction operation. At the beginning of a bus 1 to bus 2 read transaction, the routing manager 162 may be configured to transfer an entry from a bus 1 slave device via the done FIFO 142 to a bus 2 target device via the pending FIFO 154 (e.g., the route I–III). When the external bus 2 target device (not shown) immediately completes the transaction, a corresponding entry generally appears in the done FIFO 146 and is moved by the routing manager 162 to the pending FIFO 150 for transaction completion on the bus 1 side of the circuit 100 (e.g., the route IV–VI).

However, when the external bus 2 target signals a split transaction or other type of delay (depending on bus implementation), the routing manager 162 may move an entry from the FIFO 146 to the FIFO 156 so that the bus 2 slave sequencer 126b may have the entry available when the external device completes the transaction on the bus 2 side of the circuit 100 (e.g., the steps IV, Vs, and VIs). Once the transaction is completed on the bus 2 side, the routing manager 162 may move an entry from the FIFO 148 to the FIFO 150 for transaction completion on the bus 1 side (e.g., the steps VIIs, VIIIs and IXs).

In general, the circuit 100 may initiate a split transaction during a read request from one bus to another bus. The split transaction is generally initiated because the circuit 100 takes some amount of time to initiate a read transaction on the target bus and, therefore, is generally not able to respond immediately to the read transaction from the initiating bus. However, when a bus does not support split transactions, but does support extended transactions, the circuit 100 may be configured to hold the bus while the read transaction is completed from the target bus device. The circuit 100 may be configured to initiate split requests under other conditions as well. However, during a write transaction, the circuit 100 generally does not initiate a split transaction because the write transaction data is generally already available when the write transaction is initiated.

Figure 7:
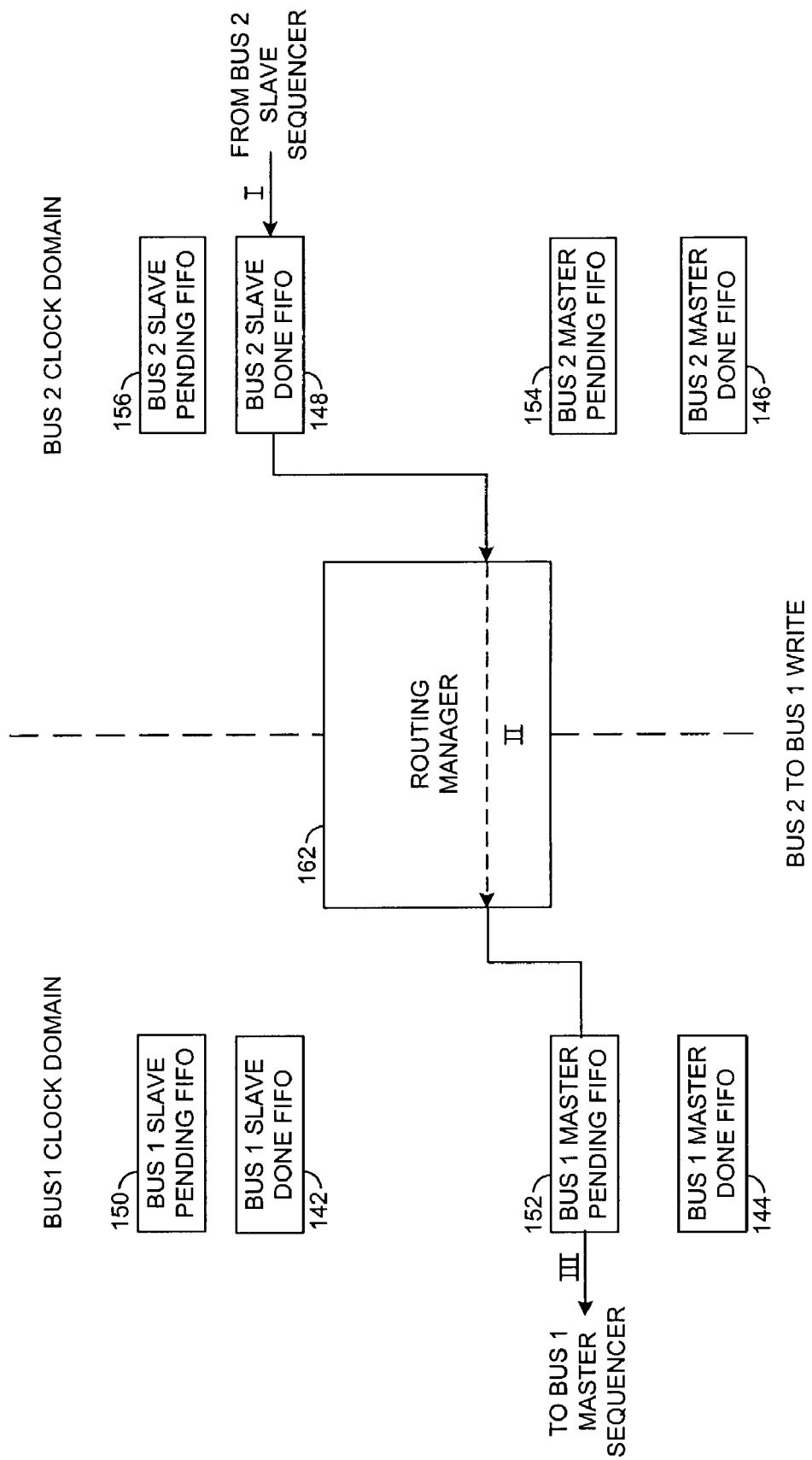
FIG. 7 is a block diagram illustrating yet another example operation of a routing manager in accordance with a preferred embodiment of the present invention.

Referring to FIG. 7, a block diagram illustrating another example write operation is shown. Roman numerals in the diagram generally indicate the sequence of operation for the example transaction. Numbers with an "s" suffix generally denote a split transaction operation. Operation of the routing manager 162 during a bus 2 to bus 1 write transaction may be similar to or different from the bus 1 to bus 2 write transaction, depending on the bus types connected to the circuit 100. In one example, the routing manager 162 may be configured to transfer transaction entries from the bus 104 via the done FIFO 148 to the bus 102 via the pending FIFO 152 (e.g., the steps I–III).

Figure 8:
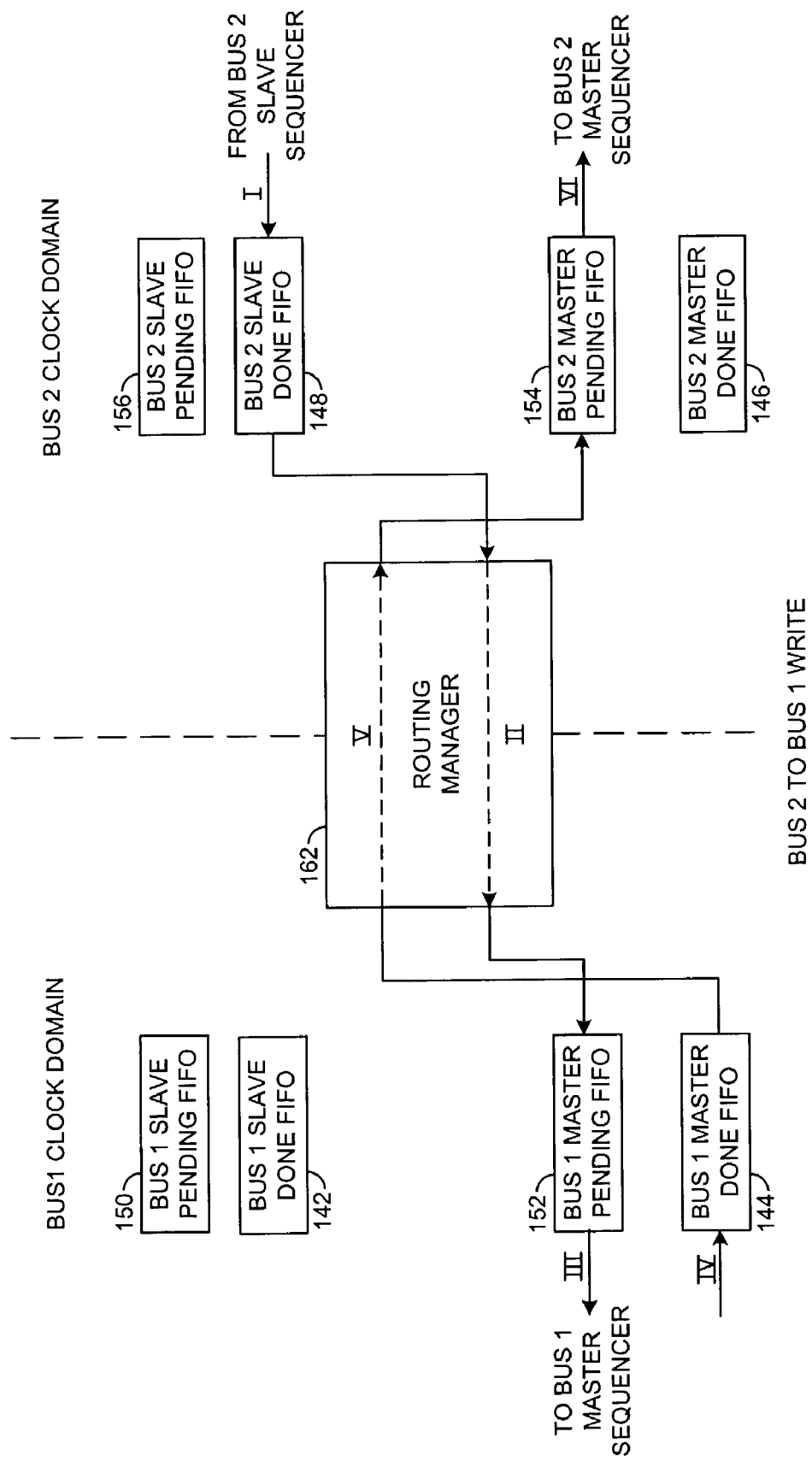
FIG. 8 is a block diagram illustrating still another example operation of a routing manager in accordance with a preferred embodiment of the present invention.

Referring to FIG. 8, a block diagram illustrating another read operation is shown. Roman numerals in the diagram generally indicate the sequence of operation for the transaction. Numbers with an "s" suffix generally denote split transaction operations. At the beginning of a bus 2 to bus 1 read transaction, the routing manager 162 may be configured to transfer an entry from the done FIFO 148 to the pending FIFO 152 (e.g., the steps I–III). Once the transaction is completed on bus 1 side (e.g., the step IV), the routing manager 162 may be configured to move the entry from the done FIFO 144 to the pending FIFO 154 for completion of the transaction on the bus 2 side (e.g., the steps V–VI). The bus 2 transaction may be immediately split, or otherwise postponed, depending on the bus implementation. However, when the transaction is not postponed, the initiating bus may be tied up for the duration of the transaction.

The operations described in connection with FIGS. 5–8 above generally involve entries other than those with the "Transaction Completed" status bit set. The routing manager 162 may be configured to treat entries in which the transaction completed status bit is set differently from entries in which the transaction completed status bit is not set. In general, the entries in which the transaction completed status bit is set are not generally routed to another sequencer. When the routing manager 162 receives a completed entry (e.g., the status bit is set), the routing manager 162 generally examines a field in the entry (e.g., an "originating sequencer" field) and decides whether to transfer the entry to another clock domain. For example, when the completed entry is received on the bus 1 side but originated from the bus 2 side, the routing manager 162 generally transfers the completed entry to the bus 2 side. Alternatively, when the completed entry is within the clock domain in which the entry was originally created, the routing manager 162 may be configured to send control data to the corresponding free buffer manager 164 requesting that the data buffer allocated for the just-completed transaction be released. Other routing schemes may be implemented accordingly to meet the design criteria of a particular application.

Figure 9:
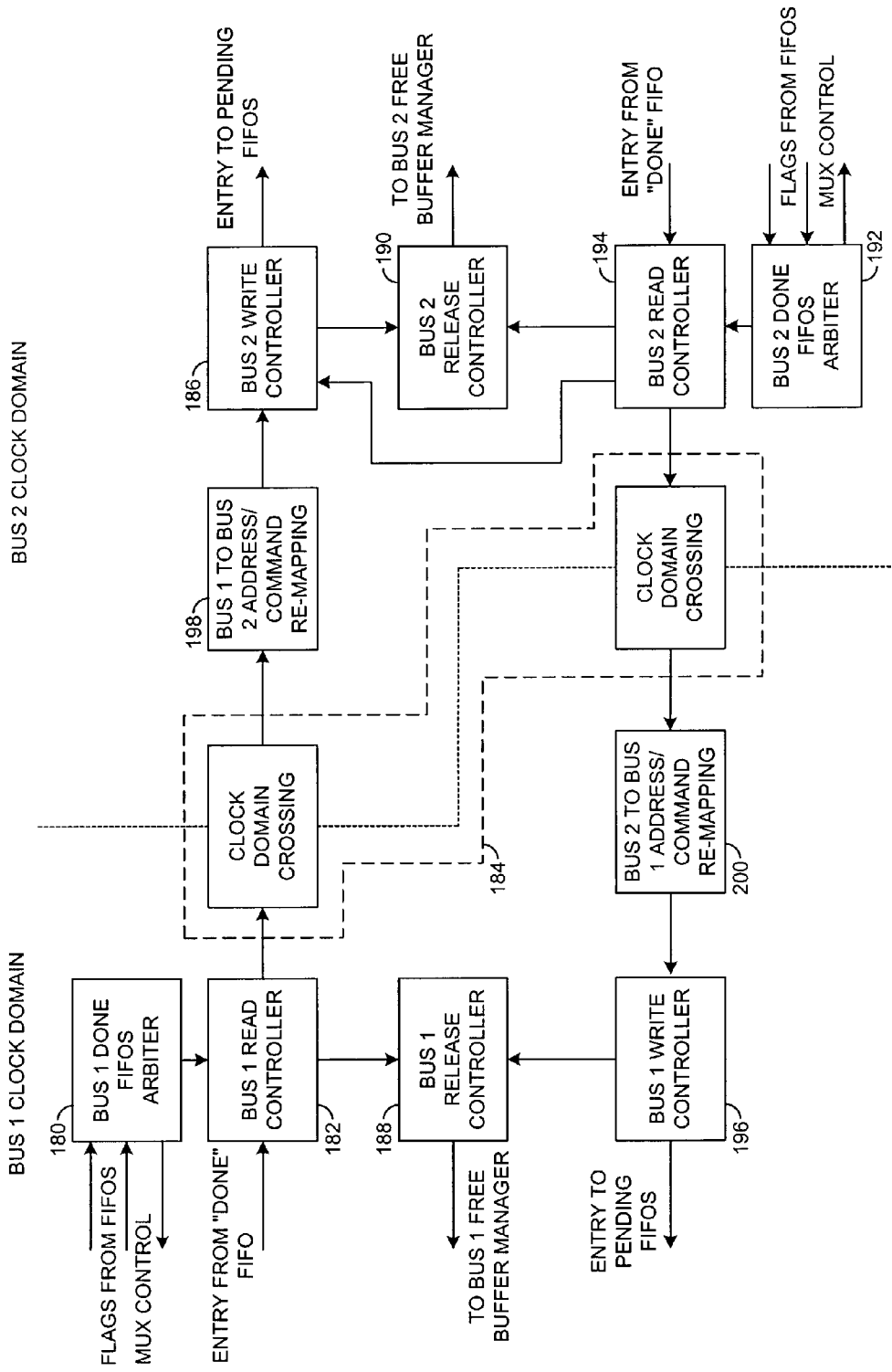
FIG. 9 is a more detailed block diagram of a routing manager of FIG. 4.

Referring to FIG. 9, a more detailed block diagram of a routing manager 162 of FIG. 4 is shown. The routing manager 162 may comprise, in one example, an arbiter 180, a read controller 182, a clock domain crossing circuit 184, a write controller 186, a release controller 188, a release controller 190, an arbiter 192, a read controller 194, a write controller 196, a main buffer 166, a number of free buffer managers 164 and a host interface (not shown). The arbiter 180 generally (i) receives "non-empty" flags from the FIFOs 142 and 144 and (ii) performs arbitration between the two potential attribute entry sources. The arbiter 180 may be configured to present a signal that controls multiplexing of the attribute busses coming out of the FIFOs 142 and 144 (e.g., the multiplexer 170a of FIG. 4). The arbitration mode between the two potential sources may be software selectable and may be performed according to, for example, a round robin process, a slave priority scheme, or a master priority scheme. However, other arbitration modes may be implemented accordingly to meet the design criteria of a particular application.

In the round robin process, the arbiter 180 may assign equal priorities to both of the FIFOs 142 and 144. When one of the FIFOs 142 or 144 is serviced, the arbiter 180 generally attempts to also service the other FIFO 144 or 142, respectively.

In the slave priority scheme, the arbiter 180 may assign a higher priority to the FIFO 142. In other words, the arbiter 180 generally does not attempt to service the FIFO 144 until the FIFO 142 is completely empty. Selection of the bus 1 slave priority arbitration scheme generally gives higher priority to bus 1-initiated transactions.

In the master priority scheme, a higher priority is generally assigned to the FIFO 144. The arbiter 180 generally does not attempt to service the FIFO 142 until the FIFO 144 is completely empty. Selection of the master priority scheme generally gives higher priority to bus 2-initiated transactions.

The read controller 182 generally analyzes an incoming entry from the FIFO 142 or the FIFO 144 to determine whether the entry is a "Completed Transaction" entry (e.g., the transaction completed status bit is set). When the entry is a completed transaction entry and the originating sequencer is the bus 1 slave sequencer 116b, the controller 182 generally routes the entry to the release controller 188. When the incoming entry is not of the "Completed Transaction" type, the read controller 182 generally sends the entry to the bus 1 to bus 2 remapping circuit 198 for transfer to the bus 2 side of the bridge implementation. The bus 1 to bus 2 address/command re-mapping circuit 198 generally performs remapping of the address and command type from the bus 1 address and command space to the bus 2 address and bus command space.

A transaction may have the transaction complete bit not set and stay in the original bus clock domain. For example, a split transaction may be routed from a master sequencer to a slave sequencer on the same bus in the PCI-X domain (e.g., when the circuit 100 responds to the slave transaction as a target).

The clock domain crossing circuit 184 may be implemented with an acknowledgment mechanism that generally provides a reliable clock domain crossing no matter what the bus 1 and bus 2 clock frequencies are. A bus 2 to bus 1 address/command re-mapping circuit 200 generally performs remapping of the address and command type from the bus 2 address and command space to the bus 1 address and bus command space. The circuits 198 and 200 may be implemented similarly.

The address remapping blocks 198 and 200 generally accept an address from one bus domain and convert the address to the address space of another bus domain. The conversion can be done in a number of ways, from brute force translation to using a table of address ranges that the incoming address maps into to generate a pointer that maps into another table of outgoing addresses. Depending on how the address for any bus on the circuit 100 is converted into an attribute, the address translation may be as simple as the addition of an offset to the incoming address to create the outgoing address. The range tables described above can be implemented using offsets instead of complete addresses. For example, an incoming address may map into the table and the corresponding offset is added to the address to create the outgoing address.

The number of entries in the translation table may be configurable (or programmable). Other attributes may change how an address is translated. When a transaction is an I/O transaction from one bus, the transaction may map to a different set of addresses than when the transaction is a simple memory or burst transaction. In one example, the look-up tables may have additional attribute bits included, or a pre-filter may be implemented to access one of several tables.

In general, a simple address mapping table may be adequate for most solutions. In one example, the address translation tables may be mapped into a register space of the circuit 100. The tables may be programmed with translation parameters prior to operation of the circuit 100 (e.g., at startup). For example, the tables may be programmed right after PCI-X configuration, as part of a driver startup. The tables may be programmed via firmware on any of the busses coupled to the circuit 100.

The write controller 186 may be configured to check whether an entry, coming from the bus 1 side is of the "Completed Transaction" type. When the entry is of the completed transaction type, the controller 186 may be configured, in a preferred bridge implementation, to route the entry to the bus 2 release controller 198. When the entry from the bus 1 side is not of the completed transaction type, the write controller 186 generally sends the entry to either the FIFO 156 or the FIFO 154. The decision is generally based on data embedded in the entry and in accordance with predefined routing rules. The bus 2 write controller 186 may receive entries from the bus 2 read controller 194. In such cases, the write controller 186 generally sends the entries either to the FIFO 154 or to the FIFO 156, depending on the specific bus implementations. Again, the transaction may end up remaining in the original bus clock domain.

The release controller 188 generally receives the address of the buffer to be released from either the read controller 180 or the write controller 196. The release controller 188 generally passes the data along with control signals to the bus 1 free buffer manager 164a, which in turn releases a buffer. In general, when a buffer is released, the buffer becomes part of a pool of available free buffers that may be used by the free buffer manager 164 when a pointer is set for a sequencer to use as a buffer for a new transaction.

The release controller 190 generally receives an address of the buffer to be released from either the read controller 194 or the write controller 186. The bus 2 release controller 190 generally passes the data along with control signals to the bus 2 free buffer manager 164b. The bus 2 free buffer manager 164b may be configured to release a buffer in response to the data and control signals.

The arbiter 192 generally operates similarly to the arbiter 180. For example, the arbiter 192 generally arbitrates, in one example, between two potential entry sources: the FIFO 148 and the FIFO 146. The arbiter 192 generally supports three modes of arbitration: the round-robin scheme where both FIFOs 146 and 148 have equal priories (described above in connection with the arbiter 180); the slave priority scheme where priority is given to FIFO 148; and the master priority scheme where priority is given to FIFO 146.

The read controller 194 generally receives an entry from the FIFO 146 or the FIFO 148 and determines whether the entry is of the "Completed Transaction" type. When the transaction is of the completed transaction type and the entry originated on the bus 2 side of the bridge, the read controller, in a preferred embodiment, generally routes the transaction entry to the bus 2 release controller 190. When the transaction did not originate on the bus 2 side, the read controller 194 generally transfers the entry to either the bus 2 write controller 186 or to the bus 2 to bus 1 address/command remapping circuit 200, depending on the specific bus implementations.

The write controller 196 generally determines whether an entry, coming from the bus 2 side of the bridge 100 is a "Completed Transaction" type entry. When the entry is a completed transaction, the write controller 196 may be configured to route the entry to the bus 1 release controller 188. When the entry is not a completed transaction, the write controller 196 generally sends the entry to either the FIFO 150 or the FIFO 152. The decision on whether the entry goes to the FIFO 150 or the FIFO 152 is generally based on data embedded in the entry and in accordance with predefined routing rules.

The main buffer generally comprises the data buffers 166 and byte enable buffers 168. The main buffer generally stores data and corresponding byte enable bits. The main buffer may be implemented, in one example, as thirty-two 1 K byte (e.g., 32 KB) memory buffers. The thirty-two KB memory buffer may be organized in two groups (e.g., upstream and downstream). However, the implementation of the main buffer may be varied based on application requirements. In one example, the main buffer allocation may be 50/50 (e.g., 16 buffers for upstream group (Bus 1 to bus 2 direction) and 16 buffers for downstream group (Bus 2 to bus 1 direction)). The buffer allocation ratio may be programmable and may be changed by a driver. In one example, the main buffer may be implemented as a multi-port synchronous random access memory (SRAM), where each port operates in a separate clock domain.

In general, one free buffer manager 164 is implemented for each clock domain. The free buffer manager 164 generally selects the next available buffer for storing data and byte enables, and provides a buffer number (or pointer) to a requesting sequencer.

The host interface (not shown) generally includes configuration and status registers that may be accessed from each of the busses coupled to the circuit 100. Because the interface is accessible from each of the busses, a host on any one of the busses may configure the bridge and/or read the status registers. The configuration registers may be shadowed on all of the bus interfaces depending on the particular application.

Figure 10A:
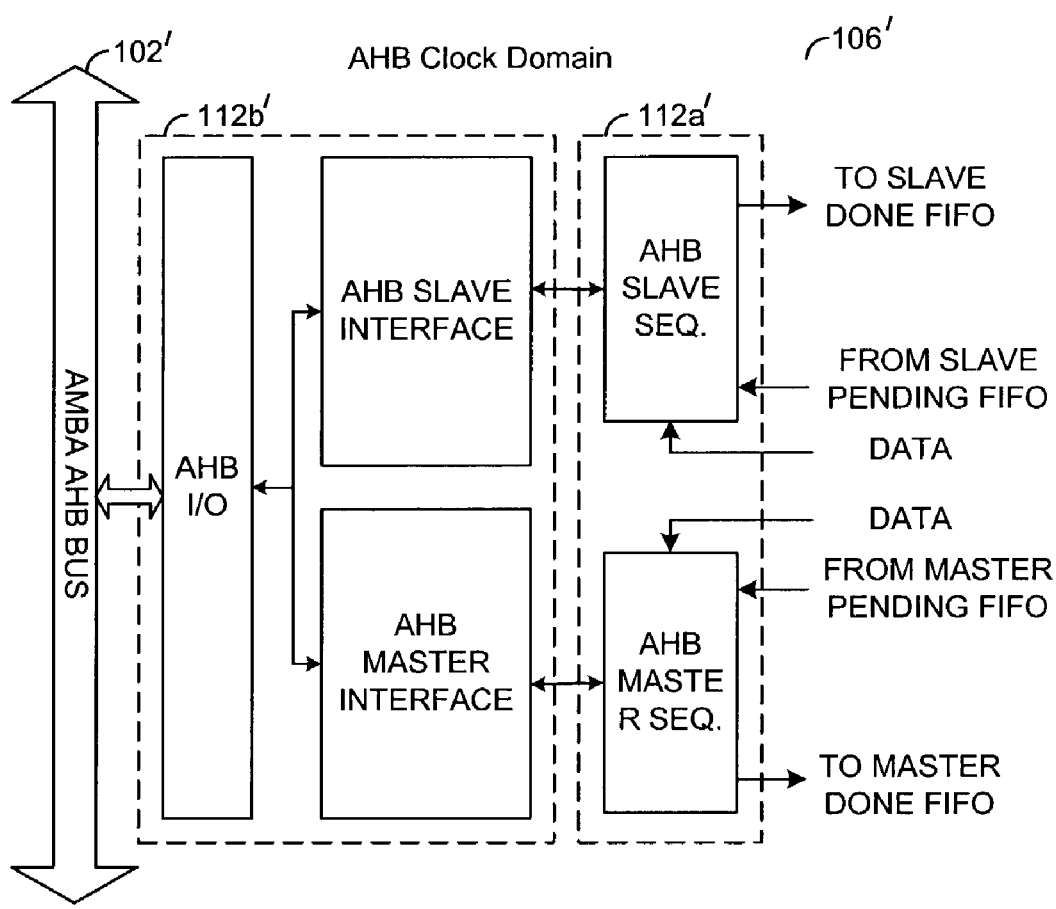
FIGS. 10A and 10B are detailed block diagrams of example bus specific interface logic in accordance with a preferred embodiment of the present invention.
Figure 10B:
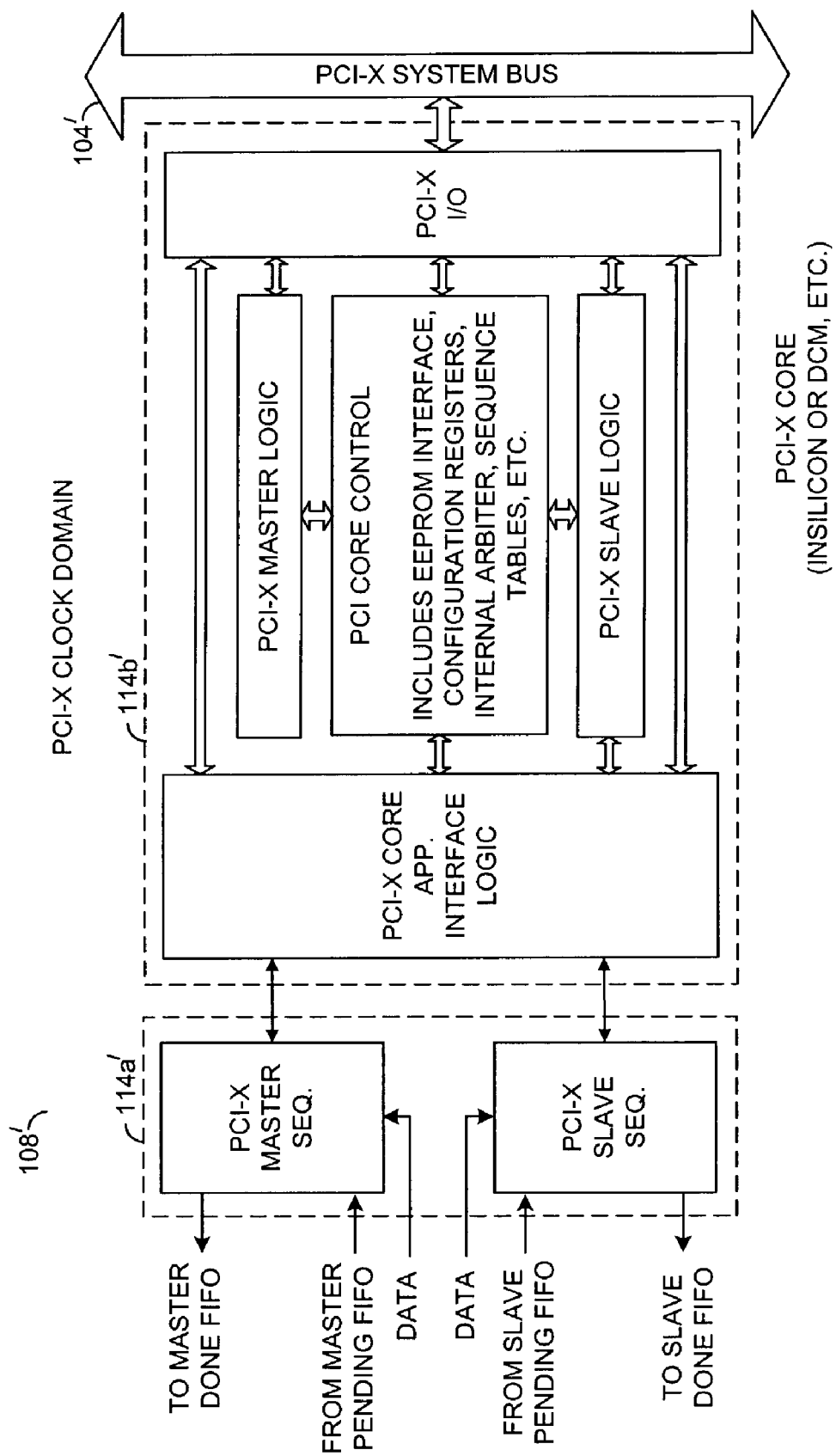

Referring to FIGS. 10A and 10B, detailed block diagrams of a circuit 106' and a circuit 108' are shown. A circuit 100' may be implemented similarly to the circuit 100. The circuit 106' may comprise AHB specific sequencers 112a' and AHB specific interface logic 112b'. The circuit 108' may comprise PCI-X specific sequencers 114a' and interface logic 114b' (e.g., a PCI-X core). The circuit 100' may be configured to couple an AHB bus and a PCI-X bus via the circuits 106' and 108', respectively. In one example, the circuit 100' may be implemented as a bridge between the AHB bus and the PCI-X bus. The circuit 100' may be optimized for write-through operations. The write-through operations may occur at the maximum transfer rate for the limiting interface with a pipeline delay generated during transaction translation and transfer across the bus to bus clock boundary. The bus transactions generally occur with no additional wait states or delays. In general, the bridge use of either bus interface 106' or 108' may be maintained as non-invasive as possible. Read operations may incur a latency hit because both the AHB and PCI-X domains generally execute the read operations as split transactions. In general, the transactions may be considered completed when the data is retrieved from the target interface.

The present invention may allow a system to be implemented in a number of ways. In one example, a system may be implemented with multiple busses and no processor, multiple busses and one processor, and/or multiple busses and multiple processors. When no processor is present, the system may implement bus configuration via a central sequential resource. A single processor implementation may employ the bridge to communicate with multiple devices on the multiple busses and the devices may communicate with one another. In the multiple processor implementation, any number or all of the busses may have processors.

In one example, a single bus transaction can be mapped by the routing manager to multiple target busses, much like a broadcast. For example, the routing manager may be configured to copy the transaction to multiple pending FIFOs of all busses connected to the circuit 100. All of the busses may be configured to execute the same transaction. The address for every bus would have been translated as normal. An example of such a system may be a system where the circuit 100 is the interface of a host bus to a large number of controllers. The host bus may issue a global reset command to all of the controllers at once when the address translation tables are programmed properly and a "global" attribute bit exists in the defined attributes.

In one example, multiple devices may be on a single bus, each of which may have an associated bus interface and target sequencer (and possibly also a master sequencer). In another example, the number of devices may be increased until there is a one-to-one correspondence between the number of devices the bridge contains and the number of address ranges to be translated. The address translation may be a simple operation for each set of transactions that does not employ a translation table.

Appropriate software coding can readily be prepared by skilled programmers based on the teachings of the present disclosure, as will be apparent to those skilled in the relevant art(s).

The present invention may also be implemented by the preparation of application specific integrated circuits (ASICs), field programmable logic arrays (FPGAs), or by interconnecting an appropriate network of conventional component circuits, as is described herein, modifications of which will be readily apparent to those skilled in the art(s). For example, the busses and/or processors/devices may be implemented internally or externally to an ASIC. In one example, the circuit 100 may be implemented as a stand-alone ASIC.

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

The various signals of the present invention are generally shown on individual inputs and outputs. The various signals of the present invention may be implemented as single-bit or multi-bit signals in a serial and/or parallel configuration. In other embodiments, some or all of the various signals may be multiplexed through one or more inputs and/or outputs as desired or required.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a plurality of first sequencers each configured to translate attributes and data between a first predetermined format and a second predetermined format;
   a plurality of second sequencers each configured to translate attributes and data between a third predetermined format and said second predetermined format;
   a logic circuit configured to route said attributes and data in said second predetermined format from one of said first and said second sequencers to another of said first and said second sequencers;
   a plurality of first memories, each (i) coupled between one of the first and second sequencers and said logic circuit and (ii) configured to store the attributes of one or more completed transactions of the sequencer to which the first memory is coupled; and
   a plurality of second memories, each (i) coupled between one of the first and second sequencers and said logic circuit and (ii) configured to store the attributes of one or more pending transactions of the sequencer to which the second memory is coupled.

2. The apparatus according to claim 1, wherein each of said plurality of first sequencers and each of said plurality of second sequencers comprises a sequencer selected from the group consisting of a master sequencer and a slave sequencer.

3. The apparatus according to claim 1, wherein each of said plurality of first sequencers is coupled between a first bus and said logic circuit and each of said plurality of second sequencers is coupled between a second bus and said logic circuit.

4. The apparatus according to claim 1, wherein said plurality of first memories and said plurality of second memories comprise FIFO memories.

5. The apparatus according to claim 1, wherein said logic circuit comprises a plurality of registers, a routing manager, a free buffer manager and a plurality of data buffers.

6. The apparatus according to claim 5, wherein said routing manager is configured to select between one of said plurality of first memories and one of said plurality of second memories.

7. The apparatus according to claim 5, wherein said routing manager comprises two or more clock domain crossing circuits.

8. The apparatus according to claim 5, wherein each of said first sequencers and each of said second sequencers is further configured to transfer said data in said second predetermined format via said plurality of data buffers.

9. The apparatus according to claim 1, wherein said logic circuit is further configured to receive attribute entries from each of said first sequencers and each of said second sequencers via one of said plurality of first memories and present attribute entries to each of said first sequencers and each of said second sequencers via one of said plurality of second memories.

10. The apparatus according to claim 1, wherein said apparatus is configured to bridge a plurality of busses.

11. The apparatus according to claim 10, wherein said logic circuit operates independently of a clock domain of said busses.

12. The apparatus according to claim 1, wherein said logic circuit is configured to route said attributes and data according to a predetermined set of routing rules.

13. The apparatus according to claim 12, wherein said predetermined set of routing rules is programmable.

14. The apparatus according to claim 13, wherein said routing rules are programmable during operation of said apparatus.

15. The apparatus according to claim 12, wherein said apparatus implements a plurality of programmable parameters selected from the group consisting of FIFO depths, routing rules, and arbitration rules.

16. An apparatus comprising:
    means for translating attributes and data between a first predetermined format of a first bus and a second predetermined format;
    means for translating attributes and data between a third predetermined format of a second bus and said second predetermined format;
    means for routing said attributes and data in said second predetermined format between said first bus and said second bus;
    means for storing attributes of one or more completed transactions coupled between each of said translating means and said routing means; and
    means for storing attributes of one or more pending transactions coupled between each of said translating means and said routing means.

17. A method for bridging two or more busses comprising the steps of:
    configuring a plurality of first sequencers to translate attributes and data between a first predetermined format of a first bus and a second predetermined format;
    configuring a plurality of second sequencers to translate attributes and data between said second predetermined format and a third predetermined format of a second bus;
    storing attributes of one or more completed transactions of the first and second sequencers in each of a plurality of first memories coupled to a corresponding one of the first and second sequencers;
    storing attributes of one or more pending transactions of the first and second sequencers in each of a plurality of second memories coupled to a corresponding one of the first and second sequencers; and
    routing said attributes and data in said second predetermined format between said first and second busses.

18. The method according to claim 17, further comprising:
    remapping address and command attributes from said first bus to said second bus.

19. The method according to claim 17, further comprising:
    splitting a transaction when said transaction is not immediately executable.

20. The method according to claim 17, further comprising the step of:
    programming one or more parameters selected from the group consisting of routing rules, buffer widths, attribute bus widths and memory widths based on the two or more busses being bridged.

* * * * *